(12) United States Patent
Fee et al.

(10) Patent No.: US 8,468,421 B2
(45) Date of Patent: Jun. 18, 2013

(54) MEMORY SYSTEM FOR ERROR CHECKING FETCH AND STORE DATA

(75) Inventors: Michael Fee, Cold Spring, NY (US); Arthur J. O'Neill, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/821,917

(22) Filed: Jun. 23, 2010

(65) Prior Publication Data
US 2011/0320909 A1 Dec. 29, 2011

(51) Int. Cl.
*G11C 29/00* (2006.01)

(52) U.S. Cl.
USPC ........... 714/763; 714/801; 714/764; 714/802; 714/800; 714/718; 714/746; 710/33; 711/5; 711/154; 711/105; 365/185.09; 365/201

(58) Field of Classification Search
None
See application file for complete search history.

(56) References Cited

U.S. PATENT DOCUMENTS

| | | | |
|---|---|---|---|
| 5,925,146 A * | 7/1999 | Murata et al. | 714/746 |
| 6,038,693 A | 3/2000 | Zhang | |
| 6,662,333 B1 | 12/2003 | Zhang et al. | |
| 7,506,226 B2 * | 3/2009 | Gajapathy et al. | 714/718 |
| 7,519,894 B2 | 4/2009 | Weib et al. | |
| 7,584,336 B2 * | 9/2009 | Tremaine | 711/155 |
| 7,861,014 B2 * | 12/2010 | Gower et al. | 710/35 |
| 8,078,949 B2 * | 12/2011 | Sadakata et al. | 714/801 |
| 2006/0080589 A1 * | 4/2006 | Holm et al. | 714/763 |
| 2009/0217134 A1 | 8/2009 | Shieh et al. | |
| 2011/0246857 A1 * | 10/2011 | Bae et al. | 714/763 |

* cited by examiner

*Primary Examiner* — John Trimmings
(74) *Attorney, Agent, or Firm* — Cantor Colburn LLP; John Campbell

(57) ABSTRACT

A memory system is provided. The memory system includes a memory element that is configured to selectively output data stored to and data fetched from the memory element. An error checking station is configured to receive the data stored to and the data fetched from the memory element. The error checking station is further configured to perform error checking on the data.

17 Claims, 4 Drawing Sheets

MEMORY SYSTEM FOR ERROR CHECKING FETCH AND STORE DATA

BACKGROUND

This invention relates generally to processing within a computing environment, and more particularly to memory systems and methods for performing error checking and correction within a computing environment.

In cache memory systems, multiple error correction code (ECC) stations are provided near the cache. For example an ECC station is provided for data being stored into the cache, and another ECC station is provided for data being fetched out of the cache. In high performance cache systems, cache size affects performance. These ECC stations take up physical space near the cache, reducing potential cache size. It is desirable to make use of the space, to potentially increase the cache size.

BRIEF SUMMARY

An embodiment includes a memory system. The memory system includes a memory element that is configured to selectively output data stored to and data fetched from the memory element. An error checking station is configured to receive the data stored to and the data fetched from the memory element. The error checking station is further configured to perform error checking on the data.

Another exemplary embodiment includes a computer implemented method of performing error checking. The method includes: receiving data that is to be at least one of stored to and fetched from a memory element; storing the data in a temporary hold register; based on at least one of a read command and a write command, selectively outputting the data in the hold register; and performing error checking on the data.

Yet another exemplary embodiment includes an apparatus for performing error checking. The apparatus includes a memory system configured to perform a method. The method includes receiving data that is to be at least one of stored to and fetched from a memory element; storing the data in a temporary hold register; and based on at least one of a read command and a write command, selectively outputting the data in the hold register.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides methods, systems, and computer program products for providing error code checking and correction of data being fetched from and stored to a particular resource. As can be appreciated, the particular resource can be any non-volatile or volatile memory resource. In one example, a single ECC station can be provided for a memory component, such as embedded dynamic random access memory (eDRAM) of a cache memory system. In this example, providing the single ECC station frees up space for additional eDRAM, reduces the power consumption, and relieves timing on a data store path.

Figure 1:
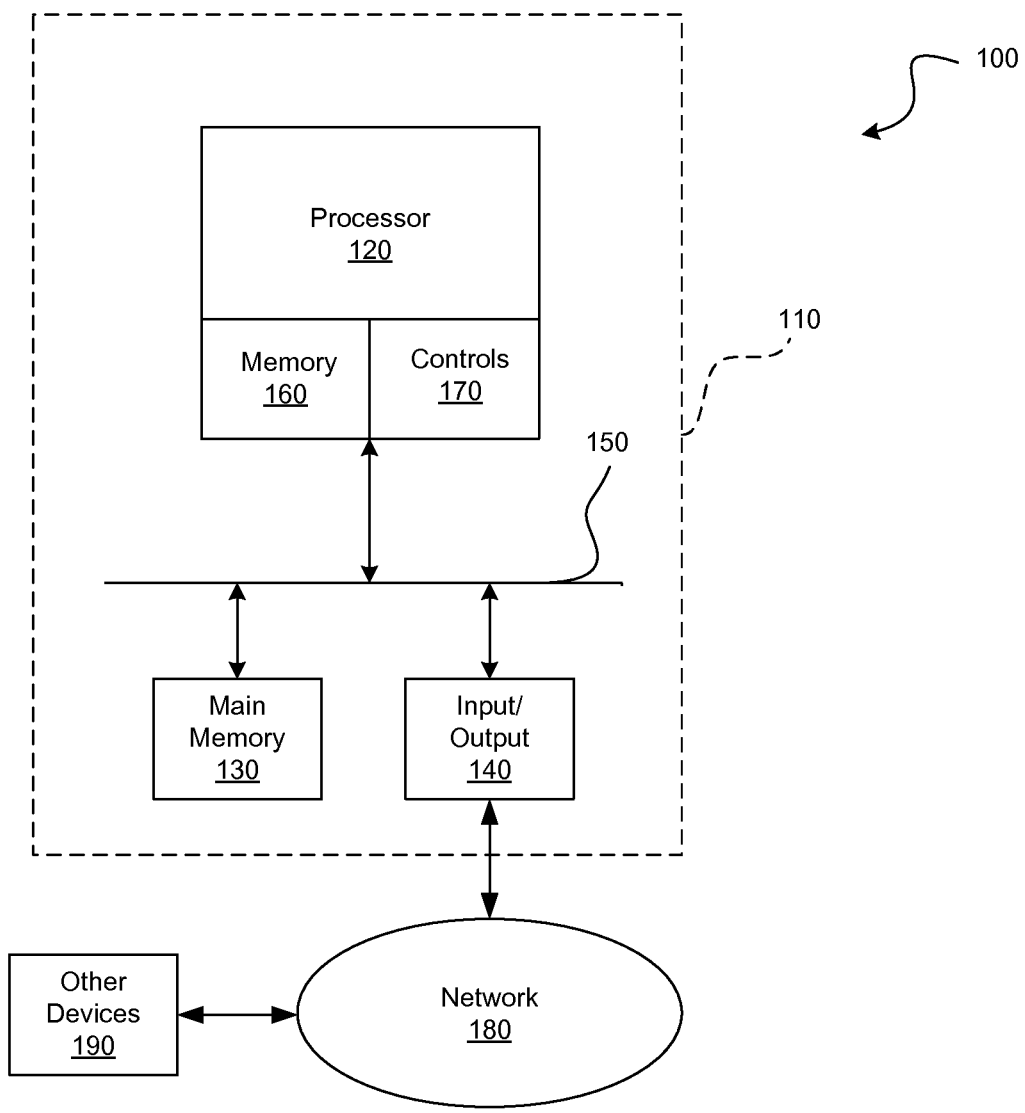
FIG. 1 depicts a computing system that includes memory system in accordance with exemplary embodiments.

Turning now to the drawings in greater detail, wherein like reference numerals indicate like elements, FIGS. 1 through 4 illustrate various embodiments of the present disclosure. FIG. 1 illustrates an exemplary computing system 100 that includes an exemplary computing device 110. The exemplary computing device 110 includes memory systems and methods in accordance with the present disclosure. As can be appreciated, the computing device 110 can be any computing device, including but not limited to, a server, a desktop computer, a laptop, a portable handheld device, or any other electronic device.

The exemplary computing device 110 includes, for example, at least one processor 120, main memory 130, and input/output component(s) 140 that communicate via a bus 150. When the computing device 110 is in operation, the processor 120 is configured to execute instructions stored within the main memory 130, to communicate data to and from the main memory 130, and to generally control operations of the computing device 110 pursuant to the instructions. The processor 120 may be any custom made or commercially available processor, a central processing unit (CPU), an auxiliary processor among several processors associated with the computing device 110, a semiconductor based microprocessor (in the form of a microchip or chip set), a macroprocessor, or generally any device for executing instructions. In various embodiments, the processor 120 includes the memory systems and methods as described herein.

In particular, the processor 120 includes memory 160 and controls 170. Generally speaking, the memory 160 includes one or more components for performing error code checking and/or correction of data stored to and fetched from the memory 160.

As will be discussed in more detail below, the controls 170 includes components that are configured to manage the error code checking and correction of data in the memory 160.

The memory 160 communicates with the main memory 130 on behalf of the processor 120. For example, the main memory 130 may include various data stored therein (e.g., instructions, software, routines, etc.) that may be transferred to and/or from the memory 160 by the controls for use by the processor 120. The input/output component(s) may include one or more components that facilitate local and/or remote input/output operations to/from the computing device, such as a display, keyboard, modem, network adapter, etc. (not shown).

The exemplary computing system 100 may further include a network 180 and other device(s) 190. The network 180 connects the computing device 110 with the other device(s) 190, and may include one or more wide area networks (WANs) and/or local area networks (LANs) such as, for example, the Internet, intranet(s), and/or wireless communication network(s). The other device(s) 190 may be, for example, one or more other computing devices, storage devices, peripheral devices, etc. The computing device 110 and other device(s) 190 are in communication via the network 180 (e.g., to communicate data there between).

Figure 2:
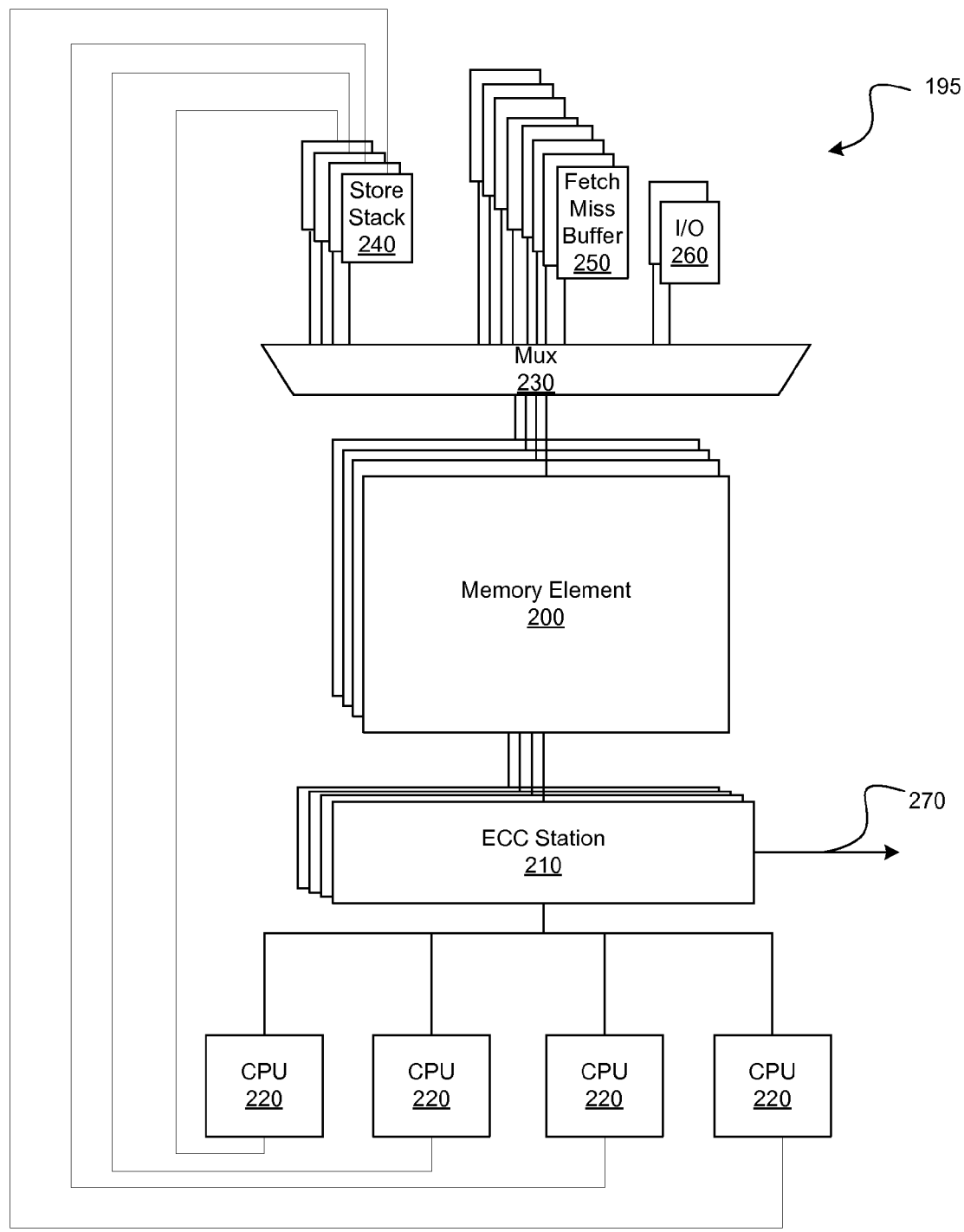
FIG. 2 depicts a memory system in accordance with exemplary embodiments.

FIG. 2 illustrates an exemplary processor subsystem 195 of the processor 120 that is configured for managing the error checking and/or correction of the memory 160. The processor subsystem 195 includes one or more central memory elements 200, a single ECC station 210 per logical central memory element 200, one or more central processing units (CPU) 220, a multiplexor (mux) 230, and a plurality of auxiliary memory elements 240, 250, 260.

The central memory elements 200 may include multiple cache levels (e.g., L1, L2, etc.) that may be on-chip or off-chip from the CPU 220. In various embodiments, one or more of the central memory elements 200 can comprise embedded dynamic random access memory (eDRAM) or other random access memory. The central memory elements 200 manage data stored from the CPU 220 via auxiliary memory element 240, retrieved from the main memory 130 (FIG. 1) via the auxiliary memory elements 250, or stored from the IO via the auxiliary memory element 260 which are multiplexed via mux 230.

A single ECC station 210 receives data from the corresponding central memory element 200 based on a fetch command or a store command issued by one of the CPUs. Each ECC station 210 performs error checking on the data stored to and fetched from the corresponding central memory element 200. When errors occur, the ECC station 210 generates a notification 270 for a recovery action based on the type of data checked.

Figure 3:
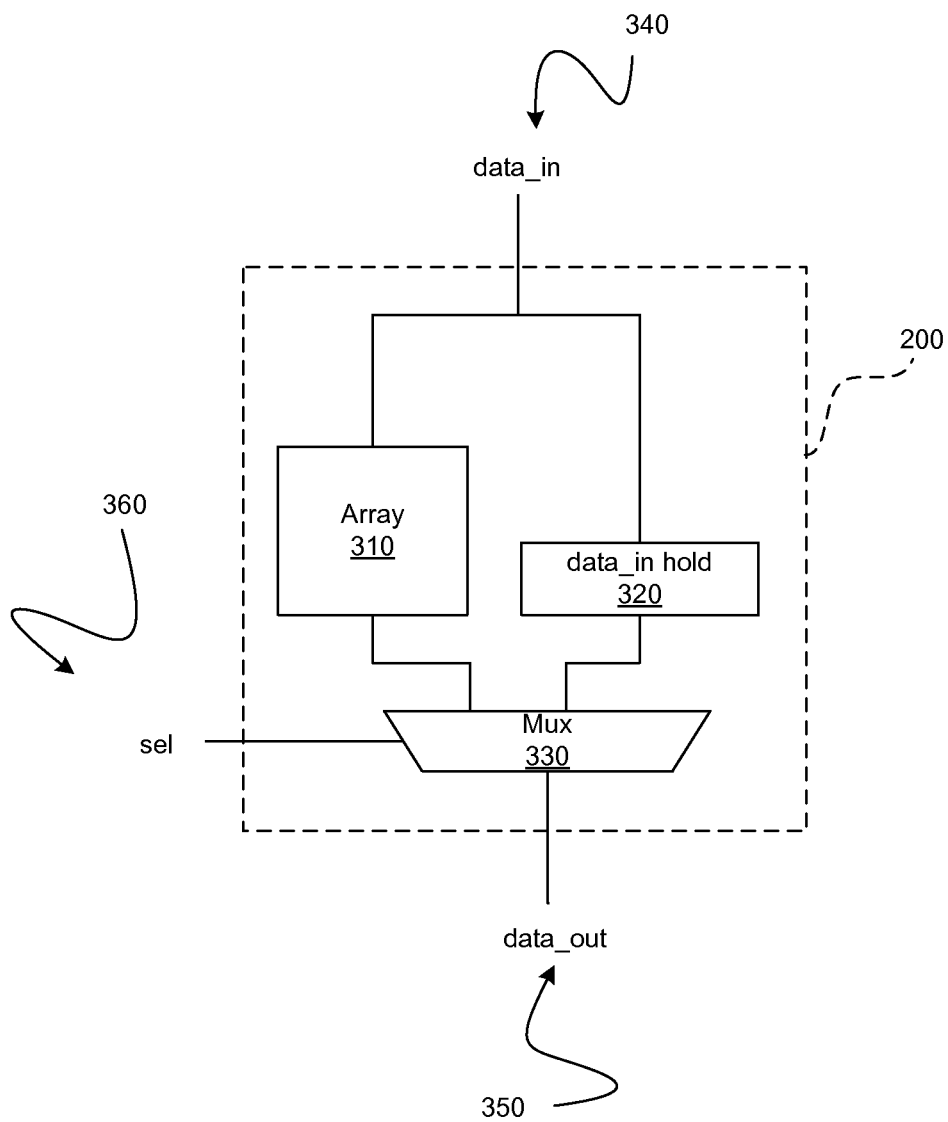
FIG. 3 depicts a write-through sub-system of the memory system in accordance with exemplary embodiments.

FIG. 3 illustrates details of the central memory element 200 in accordance with exemplary embodiments. In the embodiment shown, a write through path is provided in the memory element 200 such that a single ECC check path is provided on the data being fetched from or stored to the central memory element 200 (thus, eliminating a need for an ECC check path on the data being stored into the central memory element 200).

For example, the central memory element 200 includes an array 310, a data_in hold register 320, and a multiplexor (mux) 330. Upon processing store data (referred to as data_in 340), the data_in 340 is written into the array 310 as well as the data_in hold register 320. Read and write commands provided to the central memory element 200 are used to generate a select (sel) 360 which controls the mux 330 to multiplex the array data onto a data_out pin 350 when doing a fetch read, and multiplexes the data_in hold register 320 onto the data_out pin 350 when doing a write. The read data and the write data are sent to the data_out pin 350 on the same fixed timing in relation to when the command is sent to the central memory element 200. This allows for the single ECC check and correct station on the output to be used for both the fetch data and the store data.

Figure 4:
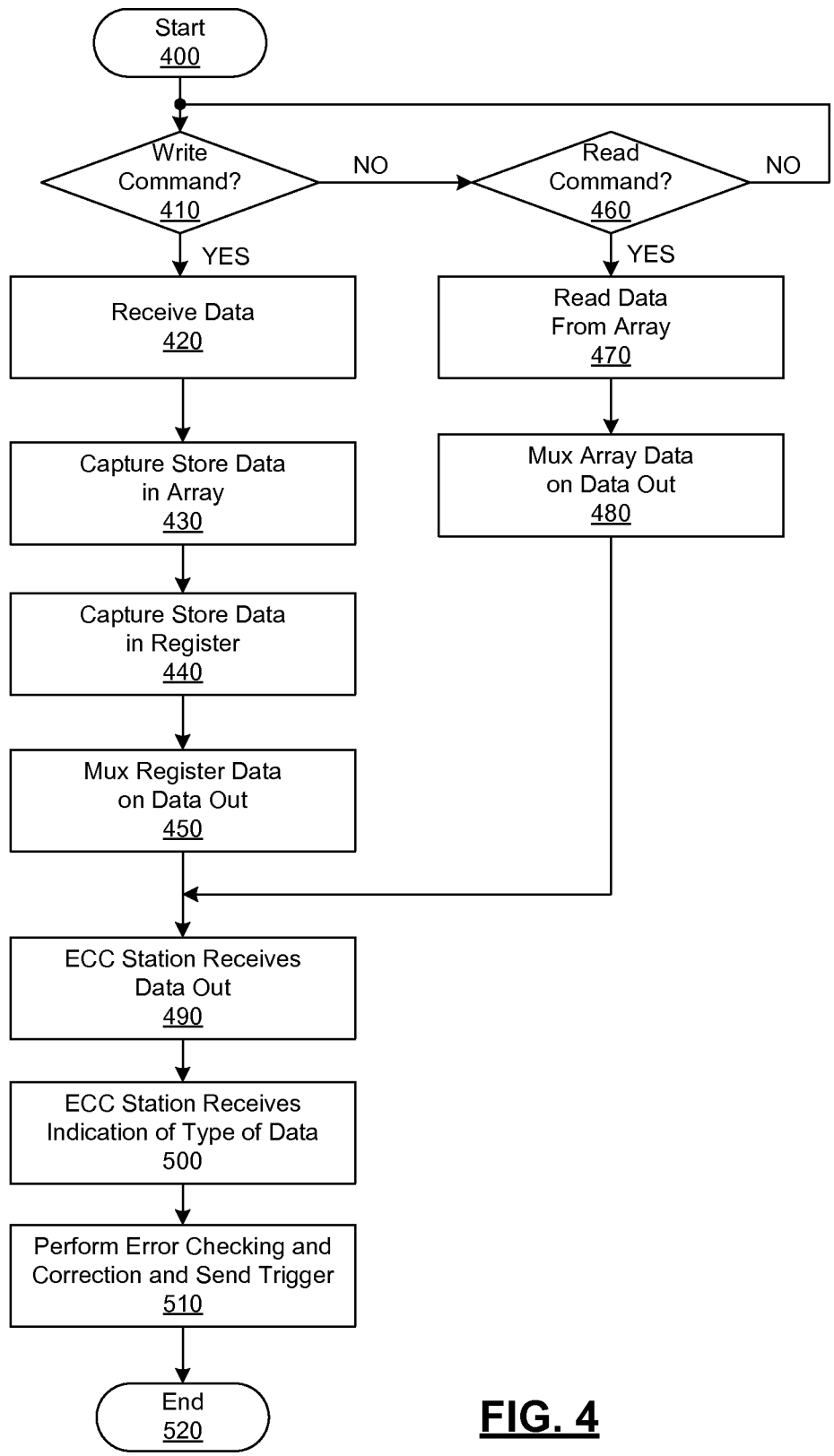
FIG. 4 depicts a method for error correction of fetch data and store data in accordance with exemplary embodiments.

FIG. 4 illustrates an error checking and correction method that can be performed by the processor sub-system of FIGS. 2 and 3 in accordance with exemplary embodiments. As can be appreciated in light of the disclosure, the order of operation within the method is not limited to the sequential performance as illustrated in FIG. 4, but may be performed in one or more varying orders as applicable and in accordance with the present disclosure. As can be appreciated, one or more steps can be added or deleted from the method without altering the spirit of the method.

In one example, the method may begin at 400. The command is evaluated at 410. If the command is a write command at 410, the store data 340 is received at 420. The data 340 is saved into the array 310 at 430. The same data 340 is captured into the data_in hold register 320 at 440. Based on the type of command received by the memory element (the write command), the data 340 from the data_in hold register 320 is multiplexed onto the data out pin 350 at 450.

However, if the command is not a write command at 410, rather the command is a read command at 460, the data 340 is read from the array 310 at 470 and the array data is multiplexed at 480. This allows for the read data to be on the data out in the same interval as the read command. Similarly, the write data is available on the data out on the same interval after the write command.

The data out pin 350 then feeds an ECC station 210 at 490. The ECC station 210 receives controls to indicate whether it is checking fetch data or store data at 500. The ECC station 210 corrects the data and sends out notifications 270 for the appropriate recovery actions to occur based on the type of data it is checking at 510. Thereafter, the method may end at 520.

As can be appreciated, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction performance system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A memory system, comprising:
a memory element configured to selectively output one of data to be stored to and data fetched from the memory element; and
an error checking station configured to receive the data output from the memory element, and to perform error checking on the data output from the memory element.

2. The memory system of claim 1 wherein the memory element includes a data hold register configured to store the data to be stored to the memory element.

3. The memory system of claim 2 wherein the memory element includes a data selector configured to selectively output the data to be stored to the memory element based on a write command.

4. The memory system of claim 3 wherein the data selector is configured to selectively output the data fetched from the memory element based on a read command.

5. The memory system of claim 1 wherein the memory element includes cache memory.

6. The memory system of claim 5 wherein the cache memory includes embedded dynamic random access memory.

7. The memory system of claim 1 wherein the error checking station is further configured to perform error correction of the data output by the memory element based on detecting, by the error checking station, an error in the data output from the memory element.

8. A computer implemented method of performing error checking, the method comprising:
detecting, by a memory element configured to process both write commands and read commands, one of a read command and a write command;
based on detecting the write command:
receiving, at the memory element, data to be stored to the memory element;
storing the received data in a temporary hold register; and
selecting, by the memory element, the data in the hold register as output data;
based on detecting the read command:

reading data from an array on the memory element; and
selecting, by the memory element, the data read from the array as the output data; and
performing, by an error checking station error checking on the output data.

9. The method of claim 8 wherein the performing error checking is based on a type of the output data, wherein the type is one of a fetch type and a store type.

10. The method of claim 8 wherein the method further comprises performing error correction on the output data based on the error checking detecting an error in the output data.

11. The method of claim 10 wherein error correction is performed by the error checking station.

12. The method of claim 8 wherein the method further comprises, generating a notification that requests a recovery action to occur based on a type of the output data, wherein the type is one of a fetch type and a store type.

13. A computer program product for performing error checking, the computer program product comprising a tangible storage medium readable by a processing circuit and storing instructions for execution by the processing circuit for performing a method comprising:
    detecting, by a memory element configured to process both write commands and read commands, one of a read command and a write command;
    based on detecting the write command:
        receiving, by the memory element, data to be stored to the memory element;
        storing the received data in a temporary hold register; and
        selecting, by the memory element, the data stored in the hold register as output data;
    based on detecting the read command:
        reading data from an array on the memory element; and
        selecting, by the memory element, the data read from the array as the output data; and
    performing, by an error checking station, error checking on the output data.

14. The computer program product of claim 13, wherein the performing error checking is based on a type of the output data, wherein the type is one of a fetch type and a store type.

15. The computer program product of claim 13, wherein the method executed by the processing circuit further includes performing error correction on the output data based on the error checking detecting an error in the output data.

16. The computer program product of claim 15, wherein the error correction is performed by the error checking station.

17. The computer program product of claim 13, wherein the method executed by the processing circuit further includes generating a notification that requests a recovery action to occur based on a type of the output data, wherein the type is one of a fetch type and a store type.

* * * * *